US010235750B2

United States Patent
Yang et al.

(10) Patent No.: US 10,235,750 B2
(45) Date of Patent: Mar. 19, 2019

(54) SEGMENTATION OF CARDIAC MAGNETIC RESONANCE (CMR) IMAGES USING A MEMORY PERSISTENCE APPROACH

(71) Applicants: AGENCY FOR SCIENCE, TECHNOLOGY AND RESEARCH, Singapore (SG); SINGAPORE HEALTH SERVICES PTE LTD, Singapore (SG)

(72) Inventors: Xulei Yang, Singapore (SG); Yi Su, Singapore (SG); Si Yong Yeo, Singapore (SG); Liang Zhong, Singapore (SG); Ru San Tan, Singapore (SG)

(73) Assignees: Agency for Science, Technology and Research, Singapore (SG); Singapore Health Services Pte Ltd, Singapore (SG)

( * ) Notice: Subject to any disclaimer, the term of this patent is extended or adjusted under 35 U.S.C. 154(b) by 45 days.

(21) Appl. No.: 15/121,761

(22) PCT Filed: Feb. 27, 2015

(86) PCT No.: PCT/SG2015/000062
§ 371 (c)(1),
(2) Date: Aug. 25, 2016

(87) PCT Pub. No.: WO2015/130231
PCT Pub. Date: Sep. 3, 2015

(65) Prior Publication Data
US 2017/0109878 A1    Apr. 20, 2017

(30) Foreign Application Priority Data
Feb. 27, 2014  (SG) ............... 10201400252V

(51) Int. Cl.
*G06K 9/00*  (2006.01)
*G06T 7/00*  (2017.01)
(Continued)

(52) U.S. Cl.
CPC ............ *G06T 7/0012* (2013.01); *G06K 9/342* (2013.01); *G06T 7/11* (2017.01); *G06T 7/12* (2017.01);
(Continued)

(58) Field of Classification Search
CPC ............. G06T 7/11; G06T 2207/10016; G06T 2207/20124; G06T 2207/30004;
(Continued)

(56) References Cited

U.S. PATENT DOCUMENTS 8,139,838 B2 *   3/2012   Sun ..................... G06K 9/3233
                                                                  382/133
8,280,136 B2 *  10/2012   Gotardo ............... G06K 9/6207
                                                                    378/4

(Continued)

FOREIGN PATENT DOCUMENTS

CA    2 274 363 A1    12/2000
CA    2 311 595 A1    12/2000

OTHER PUBLICATIONS

PCT Notification of Transmittal of the International Search Report and the Written Opinion of the International Searching Authority, or the Declaration for PCT Counterpart Application No. PCT/SG2015/000062, 17 pp., (May 15, 2015).

(Continued)

*Primary Examiner* — Bhavesh M Mehta
*Assistant Examiner* — Ian L Lemieux
(74) *Attorney, Agent, or Firm* — Womble Bond Dickinson (US) LLP

(57) ABSTRACT

A method is proposed for identifying an anatomical structure within a spatial-temporal image (i.e. a series of frames (Continued)

Segmentation result by the embodiment captured as respective times). A current frame of spatial-temporal medical image is processed using information from one or more previous and/or subsequent temporal frames, to aid in the segmentation of an object or a region of interest (ROI) in a current frame. The invention is applicable to both two- and three-dimensional spatial-temporal images (i.e., 2D+time or 3D+time), and in particular to cardiac magnetic resonance (CMR images). An initialization process for this method segments the left ventricle (LV) in a CMR image by a fuzzy c-means (FCM) clustering algorithm which employs a circular shape function as part of the definition of the dissimilarity measure.

12 Claims, 5 Drawing Sheets

(51) Int. Cl.
  *G06K 9/34* (2006.01)
  *G06T 7/12* (2017.01)
  *G06T 7/11* (2017.01)
(52) U.S. Cl.
  CPC ............... *G06T 2207/10088* (2013.01); *G06T 2207/20116* (2013.01); *G06T 2207/30048* (2013.01)
(58) Field of Classification Search
  CPC ... G06T 2207/30048; G06T 7/12; G06T 7/20; G06T 2207/20116; G06T 7/174; G06T 7/251; G06K 9/34; G06K 9/6207; G06K 9/342
  See application file for complete search history.

(56) References Cited

U.S. PATENT DOCUMENTS

| | | | | |
|---|---|---|---|---|
| 8,320,652 | B2* | 11/2012 | Cocosco | G06T 7/0012 382/131 |
| 2003/0219147 | A1 | 11/2003 | Nishiura | |
| 2008/0144933 | A1* | 6/2008 | Or | G06T 7/32 382/173 |
| 2008/0317315 | A1* | 12/2008 | Stemmer | G01R 33/56509 382/131 |
| 2009/0285466 | A1* | 11/2009 | Hipp | G06T 7/0014 382/131 |
| 2010/0215238 | A1* | 8/2010 | Lu | G06T 7/12 382/131 |
| 2010/0303328 | A1* | 12/2010 | Ciofolo | G06T 7/12 382/131 |
| 2011/0268330 | A1 | 11/2011 | Piper | |
| 2013/0101187 | A1* | 4/2013 | Sundar | G06K 9/00362 382/128 |
| 2013/0223704 | A1 | 8/2013 | Lay et al. | |
| 2015/0379724 | A1* | 12/2015 | Noga | G06T 7/0097 382/128 |
| 2016/0098833 | A1* | 4/2016 | Tsadok | G06K 9/6201 382/103 |
| 2016/0148053 | A1* | 5/2016 | Matsuzaki | G06K 9/00711 382/128 |
| 2016/0171766 | A1* | 6/2016 | Grbic | G06T 7/251 345/423 |
| 2018/0021024 | A1* | 1/2018 | Fukuda | A61B 8/5215 |

OTHER PUBLICATIONS

Charnchai Pluempitiwiriyawej, et al., "STACS: New Active Contour Scheme for Cardiac MR Image Segmentation", IEEE Transactions on Medical Imaging, vol. 24, No. 5, pp. 593-603, (May 2005).

Charnchai Pluempitiwiriyawej, et al., "Cardiac MR Image Segmentation: Quality Assessment of STACS", IEEE International Symposium on Biomedical Imaging: Nano to Macro, vol. 1, pp. 828-831, (Apr. 2004).

Chenyang Xu, et al., "Snakes, Shapes, and Gradient Vector Flow", IEEE Transactions on Image Processing, vol. 7, No. 3, pp. 359-369, (Mar. 1998).

PCT Notification Concerning Transmittal of International Preliminary Report on Patentability for PCT Application No. PCT/SG2015/000062, 12 pgs. (Sep. 9, 2016).

* cited by examiner

Segmentation result by the embodiment

SEGMENTATION OF CARDIAC MAGNETIC RESONANCE (CMR) IMAGES USING A MEMORY PERSISTENCE APPROACH

CROSS-REFERENCE TO RELATED APPLICATIONS

This patent application is a U.S. National Phase Application under 35 U.S.C. § 371 of International Application No. PCT/SG2015/000062, filed Feb. 27, 2015, entitled SEGMENTATION OF CARDIAC MAGNETIC RESONANCE (CMR) IMAGES USING A MEMORY PERSISTENCE APPROACH, which claims priority to Singapore Patent Application No. 10201400252V, filed Feb. 27, 2014.

FIELD OF THE INVENTION

The present invention relates to methods and apparatus for identifying anatomical structures within medical images, especially spatial-temporal medical images (that is, a series of two- or three-dimensional images ("frames") captured at successive respective times). The invention relates particularly to identification of anatomical structures within cardiac magnetic resonance (CMR) images of the heart of a subject. Nevertheless, the invention is sufficiently generic to be applicable for identification of dynamic anatomical or biological structures from other imaging modalities that produce time-series images, such as computed tomography and ultrasound images of the heart and the lungs, and cell transport images from digital microscopy.

BACKGROUND OF THE INVENTION

Spatial-temporal medical images such as those obtained from Cardiac Magnetic Resonance (CMR) images provide important information for diagnosis and treatment of cardiovascular diseases in a non-invasive manner. The CMR technique is considered the current gold standard for imaging the structure and function of the heart. To help in the diagnosis of disease, physicians are interested in identifying the heart chambers and measuring the change in ventricular blood volume (i.e., ejection fraction=stroke volume/end-diastolic volume×100%) and wall thickening over the cardiac cycle. Accurate extraction of the anatomical boundaries of the heart chambers is crucial to obtain reproducible quantitative measurements to support the diagnosis and follow-up of cardiac pathologies. However, manual delineation of the anatomical structures is time-consuming and tedious (even a trained clinician takes 20 minutes to do this), and limited by inter- and intra-observer variability. Therefore, it is highly desirable to develop techniques for automatic CMR image segmentation (that is, the identification of contours within images which, correspond to the outlines of specified anatomical structures).

Automatic segmentation of the human left ventricle (LV) and right ventricle (RV) from CMR data, in particular LV segmentation and tracking, has been addressed in the last two decades. Known ventricle segmentation techniques can be broadly classified into four major approaches: image-based methods, deformable model-based methods, registration-based-methods, and graph-based methods. The first approach utilizes basic image analysis operators such as thresholding, region-growing, image morphology, edge detection, pixel classification, etc, to delineate the LV and RV boundaries from the image. It uses information obtained directly from the image itself and requires no or minimal prior information from the user (i.e. the human operator of the computer). The second approach trains a shape/curve model of the LV or RV using images of previous subjects, and lets the curve model evolve in images of new subjects until it converges to the LV or RV boundaries. It takes advantage of the fact that ventricles of different subjects have similar shapes. The basic idea of the third approach is to transfer expert segmentations of training images (i.e., atlases) onto target images through image registration, and then fuse the transferred segmentations to derive an ultimate segmentation. The last approach also does not require heavy reliance on explicitly learned or encoded priors, but the user has to initialize a set of foreground and background seeds.

Although ventricle segmentation methods have improved over the last few decades, accurate LV and RV segmentation is still acknowledged as a difficult problem, especially for RV segmentation (due to the high anatomical complexity and poorly-delineated ventricular boundaries of the RV). Clinical applicability of most of the developed techniques for segmenting cardiac structures robustly is yet to be realised. Automatic segmentation of LV and RV from CMR data typically faces four challenges: 1) the lack of edge information; 2) the overlap between the intensity distributions within the cardiac regions; 3) the shape variability of the ventricle contours across slices and phases; and 4) the inter-subject variability of these factors.

Conventionally, the most common technique to handle these challenges is to incorporate prior model information into the segmentation, such as the active shape model, active appearance model, and anatomical atlas registration model, etc. However, such models need to be constructed or learned from many manually segmented images, which is cumbersome, labour-intensive, subjective and of limited use due to anatomical variability (pathology typically causes large variability in anatomical structures) and image contrast variability (e.g., due to artefacts or different imaging protocols). In addition, most existing ventricle segmentation methods operate on static images. As a result, the segmentation performance is limited by the data available in an individual frame, particularly for low signal-to-noise ratio (SNR) images, where the observation from a single frame alone may not provide enough information for a good segmentation.

Furthermore, to achieve full automation and eliminate inter- and intra-observer variability, the initialization of an image segmentation algorithm should also be automatic, and there is currently still a need for a fast and robust initialization procedure. Many automatic medical image segmentation techniques rely on a combination of information directly derived from the image and information provided by prior models of anatomy and its appearance in the image. Due to the limitations and the construction cost of prior models, methods that rely primarily on image information have distinct advantages.

SUMMARY OF THE INVENTION

The present invention aims to provide new and useful methods for identifying anatomical structures within spatial-temporal medical images, and particularly for identifying anatomical structures within cardiac magnetic resonance (CMR) images of the heart of a subject.

In general terms, a first aspect of the invention proposes that a current frame of spatial-temporal medical image is processed using information from one or more previous and/or subsequent temporal frames, to aid in the segmentation of an object or a region of interest (ROI) in a current frame. The invention is applicable to both two- and three-dimensional spatial-temporal images (i.e., 2D+time or 3D+time).

In other words, the invention proposes that the current frame is processed using information from to one or more neighbouring frames. The term "neighbour" is used in this document to include nearest neighbour (i.e. the immediately preceding or succeeding frame), but the term is used to include also all the preceding and/or succeeding frames within a predefined neighbourhood of the current frame (i.e. within a certain number of frames k from the current frame).

The invention makes possible an intelligent image segmentation process which incorporates an automatic contour initialization mechanism, and a segmentation refinement mechanism that iteratively improves the segmentation results.

Over the duration of a single cardiac cycle, the standard cine-MRI protocol acquires approximately 20-25 frames of stacked images of the heart. Since adjacent frames are imaged over a short time period (approximately 50 ms), the LV and RV boundaries exhibit strong temporal correlation. Thus, ventricle boundaries identified in the adjacent frames may provide information regarding the location of the ventricular boundary in the current frame. The present invention exploits the dynamics of the heart and incorporates the information from adjacent frames into the detection and tracking of the evolving ventricle boundaries.

The present invention makes possible, in particular, a computer-aided methodology to segment the LV and RV with minimal user interaction in 2D+T spatio-temporal images produced by short-axis CMR. An intialisation propagation mechanism allows the result of segmenting one frame to be used for the contour initialisation of successive frames (or, more generally, contour initialisation of one or more previous and/or subsequent frame(s)) until the segmentation is done on all the frames. An segmentation refinement mechanism allows the segmented contours of the previous and/or subsequent frames to be used to refine the result of the current frame.

The presented framework is general and most of the image segmentation algorithms mentioned in the background section of this document can be integrated into it. The incorporation of the memory persistent methodology into the CMR image segmentation makes possible a better segmentation performance in terms of accuracy and robustness when compared to the original method. It may provide greater insensitivity to contour initialization.

The invention is inspired by how human make use of the persistence of memory, i.e. using memory to assist current action. In neurological research, persistence of memory refers to the way that memories are stored so that they are accessible and can be used in the future. Cardiologists apply similar cognitive processing (the segmentation result of the current frame will be affected by the memory of the results from the past and/or previous frames) to aid in the decision making during manual segmentation of cardiac images, especially when boundaries of the ROI are vague. Even when there is a lack of edge information of the LV or RV ROI in a current frame, the cardiologist can still identify a reasonable contour by remembering what he observed in the past/previous frames. Inspired by such memory persistence, the present invention provides a segmentation framework to incorporate the dynamic information from previous and/or future frames into the detection and tracking of the evolving LV and RV boundaries.

A second aspect of the invention proposes a cardiac magnetic resonance (CMR) image segmentation method based on fuzzy image segmentation that is predominantly image-driven. It does not use any prior knowledge, and makes only plausible assumptions about the image and the imaged heart.

In general terms, the second aspect of the invention proposes segmenting a CMR image, such as segmentation of the left ventricle (LV) endocardial border, by a fuzzy c-means (FCM) clustering algorithm which employs a circular shape function as part of the definition of the dissimilarity measure.

Embodiments of the proposed circular shape constrained FCM (CS-FCM) algorithm can integrate both intensity related feature and spatial shape information into the clustering procedure. As a result, pixels having similar intensity information but located in different regions (LV region or non-LV region) can be differentiated.

A weighting parameter may be used to adjust the weight of the spatial distance against the intensity feature, which increases the flexibility of the proposed CS-FCM algorithm.

Experimental results of using embodiments of the second aspect of the invention to process real CMR images have demonstrated two obvious advantages of the proposed CS-FCM over standard clustering algorithms like FCM: the CS-FCM method successfully distinguishes the LV from other structures which have similar intensity to the LV; and it correctly segments the LV even when papillary muscles are adjacent to or fall inside the LV region.

The CS-FCM method may be used to produce an initial segmentation of an image of the LV, which is a first frame of a spatial-temporal image of the LV, and the result is used as the initialization of a method according to the first aspect of the invention, to segment other frames of the spatial-temporal image. That is, the second aspect of the invention may be used for initialization of a method according to the first aspect of the invention.

The methods of the present invention are preferably performed automatically by a computer processor of a computer system (e.g. a general purpose computer such as a personal computer (PC)), running computer program instructions. The term "automatically" is used to mean substantially, without human involvement, except as regards to initialization of the method. The initialization may include indicating a region of interest (ROI) on the image, to which the methods of the invention may be applied.

The results of the methods of the present invention may be used in a method of identifying an irregularity in the anatomical structure. Once the irregularity is identified, a process such as a surgical process may be used to address the irregularity.

BRIEF DESCRIPTION OF THE DRAWINGS

Embodiments of the invention will now be described for the sake of example only with reference to the following figures, in which.

DETAILED DESCRIPTION OF THE EMBODIMENTS

Figure 1:
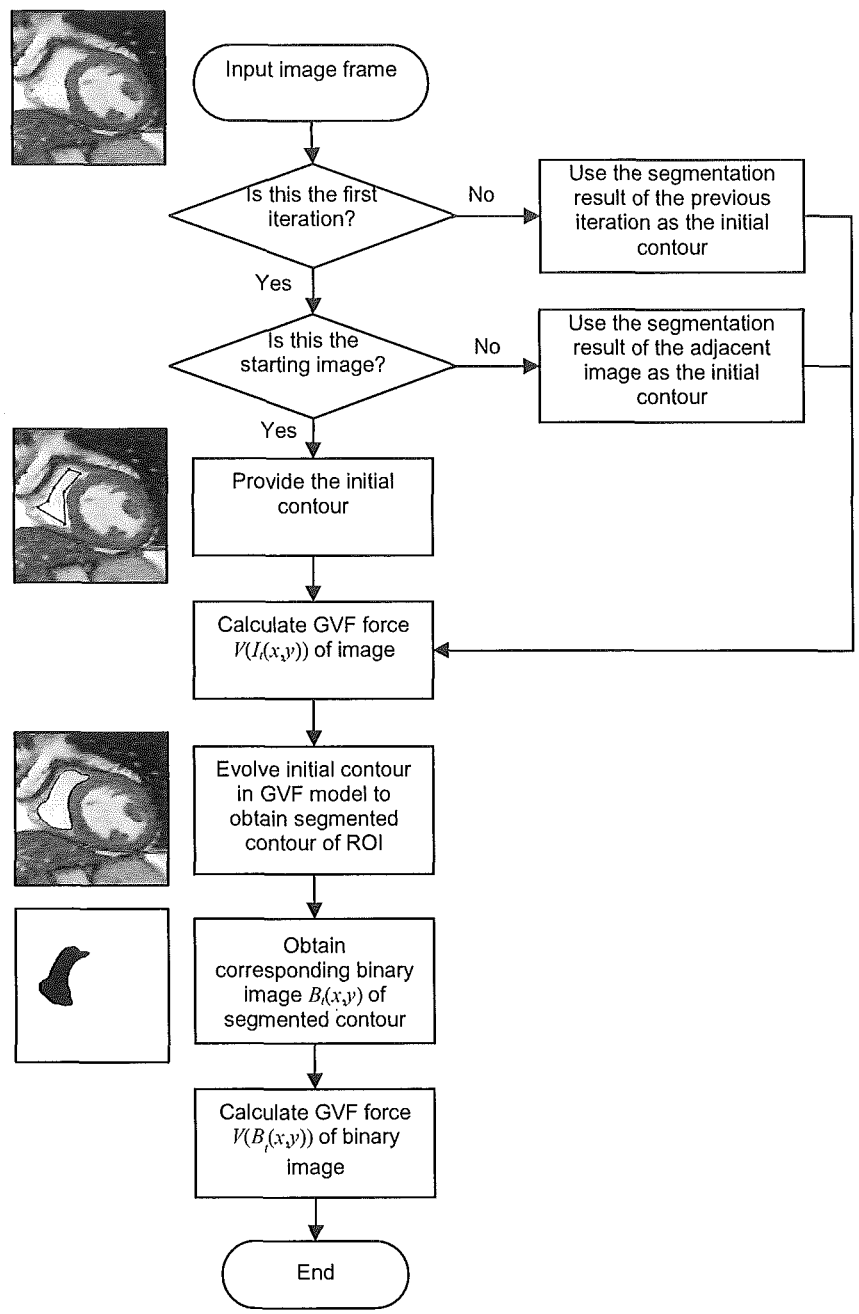
FIG. 1 is a flow-chart of the intra-image processing framework of the memory persistence method.

1. Embodiment of the "Memory Persistence" Aspect of the Invention

The following explanation denotes a sequence of two-dimensional (2D) CMR image frames from a single cardiac cycle as:

$$I_t(x,y) \quad t=1,2,\ldots,N$$

where $I_t(x,y)$ denotes the 2D image frame at time t, and N is the total number of frames in a single cardiac cycle.

From these images it is intended to generate a contour, and to produce corresponding segmented binary images in which the intensity of the pixels within the contour is set to 255, and the intensity of other pixels is set to 0. The segmented binary images are denoted by $$B_t(x,y) \quad t=1,2,\ldots,N$$

where $B_t(x,y)$ denotes the 2D binary image from the segmentation of the image frame $I_t(x,y)$ at time t.

To segment a given frame at time t, instead of solely using the information from the current image $I_t(x,y)$ (as did most of the existing methods), the proposed framework incorporates into the segmentation techniques information from segmented binary images of previous and/or future frames, specifically from time t−k to time t+k. The number of previous and future frames is thus determined by the integer parameter k, which will be discussed later in this section.

The framework is general and most existing image segmentation methods can be integrated into it. However, for the convenience of illustration, the present embodiment uses the active contour model—gradient vector flow (GVF) model—to exemplify the utility of a framework according to the invention. Detailed information about GVF can be found in Chenyang Xu, Jerry L. Prince. Snakes, Shapes, and Gradient Vector Flow. IEEE Transactions on Image Processing 7(3): 359-369, March 1998.

An active contour or snake is a curve defined within an image domain that can deform under the influence of internal forces coming from within the curve itself and external forces arising from the image data. The internal and external forces are defined so that the snake will conform to an object boundary or other desired features within an image. The GVF forces are dense vector fields derived from images by minimising the energy functional $$E=\iint \mu(u_x^2+u_y^2+v_x^2+v_y^2)+|\nabla f|^2|V-\nabla f|^2 dxdy \quad (A)$$

where $V(I(x,y))=[u(x,y),v(x,y)]$ denotes the GVF force of the image I(x,y), $f(x,y)$ is an edge map of the image I(x,y), $\nabla f$ is the gradient of the edge map $f(x,y)$, and $\mu$ is a weighting parameter. For a binary image, suitable edge map functions are $f^{(1)}(x,y)=-I(x,y)$ and $f^{(2)}(x,y)=G_o(x,y)*I(x,y)$, where $G_o(x,y)$ is a two-dimensional Gaussian function with standard deviation σ. For general grayscale images, suitable edge map functions are $f^{(3)}(x,y)=-|\nabla I(x,y)|^2$ and $f^{(4)}(x,y)=-|\nabla[G_o(x,y)*I(x,y)]|^2$ where $\nabla$ is the gradient operator. The value of V is then obtained by solving the following two Euler equations:

$$\mu\nabla^2 u-(u-f_x)(f_x^2+f_y^2)=0$$

and $$\mu\nabla^2 v-(v-f_x)(f_x^2+f_y^2)=0$$

where $\nabla^2$ is the Laplacian operator, $f_x$ denotes $\partial f/\partial x$, and $f_y$ denotes $\partial f/\partial y$.

Compared to the previous active model or snake techniques, the GVF has been proven superior to many force field methods due to its greater active range, especially in its ability to approach the boundary of concave regions.

For each image $I_t(x,y)$ at time t, the embodiment calculates its GVF force $V(I_t(x,y))$ by minimizing the energy functional (Equation A), and stores it in memory. The minimization algorithm begins with an initial estimate of the position of the desired contour (GVF snake), which in effect specifies a region of interest (ROI)—i.e. it specifies the anatomical structure which the embodiment segments. In the case that the present method is used to find the contour of the LV, that initial estimate may be found using the CS-FSM model (see below), which has been found to give an estimate of the LV which is sufficiently close to the actual region of interest for the LV (i.e. the endocardial boundary of the left ventricle chamber) to ensure that the embodiment produces a good segmentation result. For other anatomical structures, other initial estimates may be better. A manual positioning of the contour would work for any structure (such as the RV, or indeed the lungs if the application is used for a different portion of the body). Note that this manual positioning only has to be done for one frame of the spatial-temporal image, since, as explained below the segmentation of that frame is used to provide initialization for the other frames.

The embodiment uses the converged result for $V(I_t(x,y))$ to produce a binary image $B_t(x,y)$, where the binary values respectively represent that pixel (x,y) is believed to the inside or outside the anatomical structure.

Similarly, the embodiment calculates the GVF force for each segmented binary image $B_t(x,y)$ at time t, denoted by $V(B_t(x,y))$, and stores it in memory. $V(B_t(x,y))$ is obtained based on the first two edge map functions mentioned earlier, i.e., $f^{(1)}$ and $f^{(2)}$, since this is a binary image.

To incorporate the dynamic information from the previous and future frames into the segmentation of the current frame, the invention uses a combination of GVF forces from both the original image I(x,y) and k preceding and k succeeding binary images B(x,y) in the sequence to define a modified GVF force V* denoted by:

$$V^*(x,y) = V(I_t(x,y)) + \sum_{i=t-k}^{t+k} e^{-\sigma|i-t|} V(B_i(x,y)) \quad (B)$$

where k is the integer parameter denotes the time offset, i.e., the number of frames from the previous and future frames, $V(I_t(x,y))$ and $V(B_t(x,y))$, respectively, are the GVF forces of original image $I_t(x,y)$ and binary image $B_t(x,y)$, respectively, and σ is a weighting parameter that controls the weight of the GVF force from the binary images. Note that the summation preferably includes i=t. As seen from Equation (B), the stored GVF forces from the previous and future frames are combined into the current frame, which is in accordance with the claim that dynamic information is used for dynamic evolution of the ventricle shape.

The memory persistence approach for segmenting a region-of-interest (ROI) from a cyclic sequence of images $I_t(x,y)$ consists of two main components: The first component relates to intra-image processing while the second component relates to inter-image processing. The aim of the former is to perform image segmentation to obtain a "memory imprint" while the latter utilises the "memory imprints" across multiple images for refinement of the segmentation results.

The intra-image processing component for a particular i-th iteration consists of the following steps:

(1) Input an initial configuration of the contour in the image $I_t(x,y)$ at time t. This initial contour can be defined as follows:
  a. If this is the first iteration and $I_t(x,y)$ is the starting image of the whole memory persistence process, the initial contour is defined manually or by a suitable contour initialisation procedure, such as the CS-FCM algorithm (see below).
  b. If this is the first iteration and $I_t(x,y)$ is not the starting image of the whole memory persistence process, the initial contour is defined automatically by propagating the image segmentation result of an adjacent frame to itself, and using that as the initial contour.
  c. If this is not the first iteration, the image segmentation result of the previous iteration is used as the initial contour.
(2) Calculate the GVF force $V(I_t(x,y))$ using Equation (A) with $f^{(3)}$ or $f^{(4)}$ as the edge map function. Store the result.
(3) Use the GVF model to evolve the initial contour in Step (1) to obtain the segmentation the ROI.
(4) Obtain the binary image $B_t(x,y)$ corresponding to the segmented contour of the ROI.
(5) Calculate the GVF force $V(B_t(x,y))$ using Equation (A) with $f^{(1)}$ or $f^{(2)}$ as the edge map function. Store the result. $V(B_t(x,y))$ is the memory imprint that will influence the GVF forces of its neighbouring frames.

A schematic of the intra-image processing procedure is shown in FIG. 1.

The inter-image processing component is an iterative process and a synchronous update approach will be described. In practice, it is also possible to adopt an asynchronous update approach. The procedure consists of the following steps:

(1) Define the persistence duration k, in terms of the number of frames. For example, if k=2, the segmentation result of a particular frame will be influenced by the memory imprints of the 2 frames preceding it and the 2 frames succeeding it.
(2) For the first iteration, perform the intra-image processing steps described above for every frame in the image sequence. As mentioned, for the starting image, an initial contour needs to be provided, either manually or by a suitable algorithm. The segmented contour of this starting frame can then be propagated to the adjacent frame.
(3) For every frame in the sequence, calculate the updated GVF force $V^*(x,y)$ using Equation (B). Store the results of $V^*(x,y)$ for all frames.
(4) Use the updated GVF model in each frame to evolve its existing contour to obtain a refined segmentation of the ROI.
(5) Obtain the binary image $B_t(x,y)$ corresponding to the refined segmented contour of the ROI for each frame.
(6) Calculate the GVF force $V(B_t(x,y))$ using Equation (A) with $f^{(1)}$ or $f^{(2)}$ as the edge map function. Store the result.
(7) Repeat Steps (3) to (6). The number of iterations is determined by the user. Using an unduly large number of iterations can result in over-smoothing. In practice, 5 to 10 iterations are sufficient. Alternatively, the implementation can be incorporated into a semi-supervised process to allow user to decide when to terminate the iteration.

Figure 2:
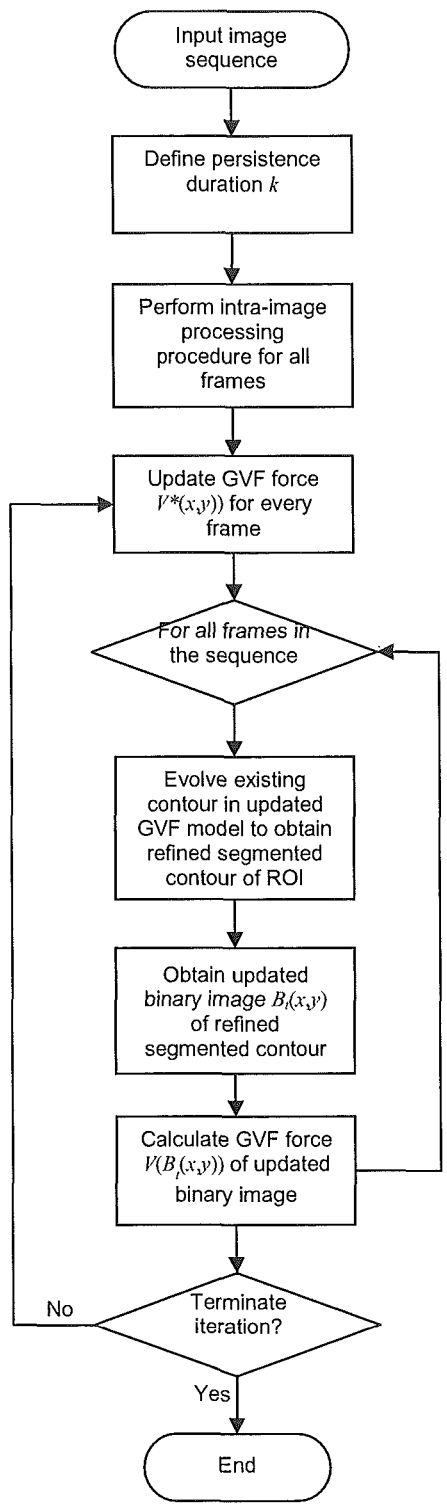
FIG. 2 is a flow-chart of the inter-image processing framework of the memory persistence method.

A schematic of the inter-image processing procedure is shown in FIG. 2.

Results

To demonstrate and evaluate the performance of the embodiment, we apply it to segment RV on a sequence of CMR image frames. RV segmentation is acknowledged as a very challenging problem due to its anatomical complexity. For the purpose of qualitative comparison, all the images are also subjected to the original GVF model.

Figure 3:
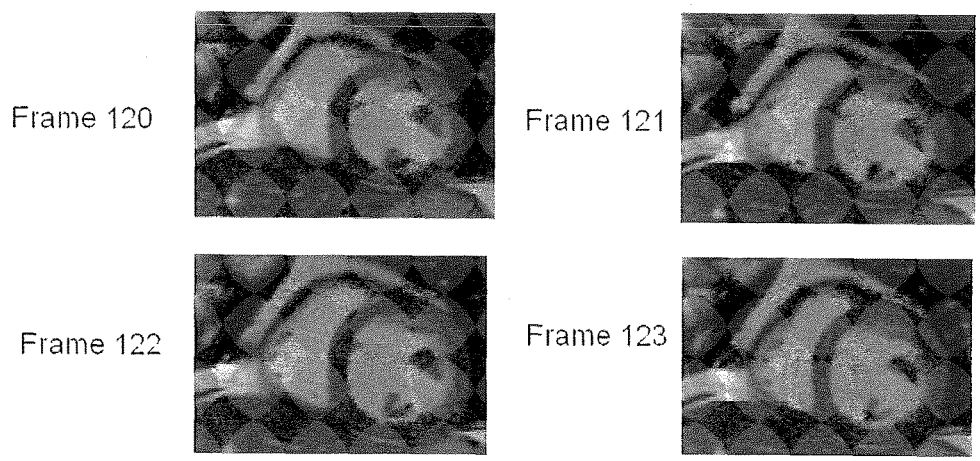
FIG. 3 shows four sequential CMR images used for the testing the embodiment.

FIG. 3 shows four sequential CMR images. From the bottom-left corner of Frame 120, it can be observed that the RV boundary is very fuzzy, and that there is a sharp edge located in the left side of the vicinity. It will be difficult for most existing segmentation methods to delineate the RV boundary in this frame. Segmentation may fail due to the lack of boundary information or image field distortion by the sharp edge. The boundary becomes clearer and clearer through Frames 121 to 123.

Figure 4:
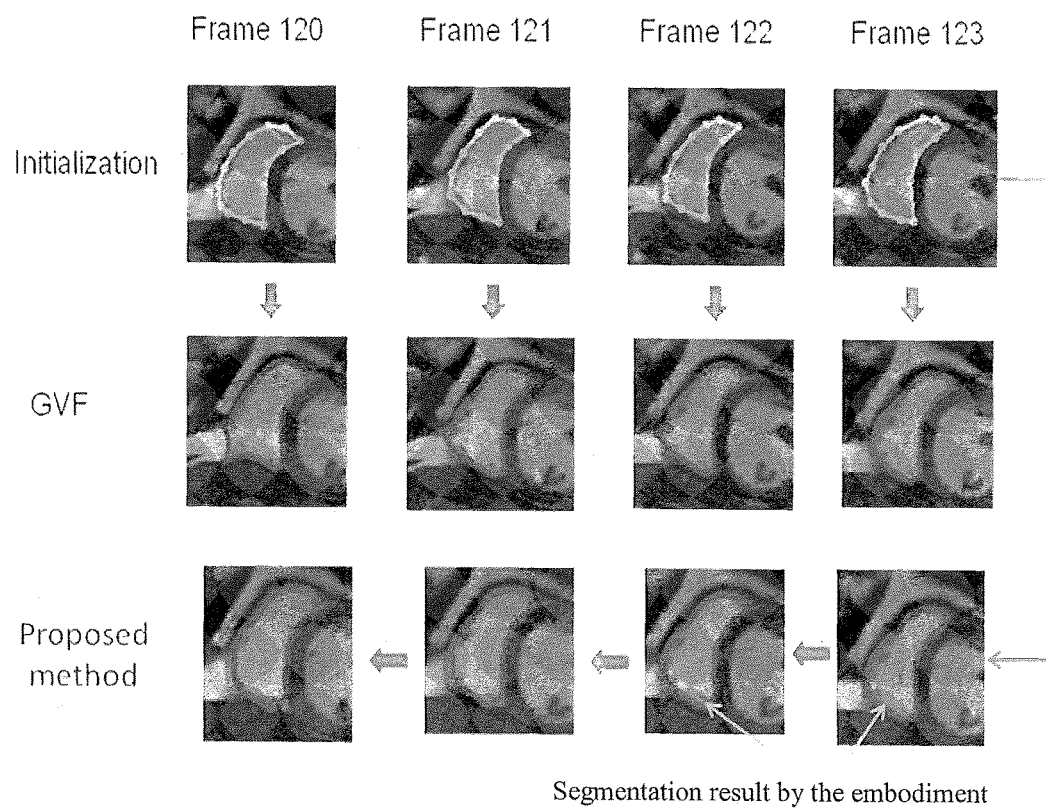
FIG. 4 shows how the four CMR images (in the top row of FIG. 4) are processed by the prior art GVF method (the second row of FIG. 4) and the embodiment of FIG. 2.

We applied the original GVF method and the embodiment to the four sequential images of FIG. 3. FIG. 4 shows the segmentation results. The first row (top row) of FIG. 4 is the original images with fine contour initialisations, the initial contours are indicated by a line. All the contours in the top row are defined manually, so that they lie close to the actual boundaries of the ROI. The second row and third row show the segmentation results by the original GVF method and the presented framework, respectively. In each case, the segmented contours are indicated by a line. From the second row, it can be observed that even with a fine initialisation, the GVF method still wrongly deforms the RV contour to the sharp edge in Frame 120. Also, in Frames 121 and 122, the RV contour deformation is distorted by the sharp edge to some extent; the only good result is achieved in Frame 123. In contrast, the embodiment (as shown in the third row) achieves good results for all four frames. The incorporation of the dynamic information passed from the past frames to the current frame can prevent the distortion due to the sharp edge.

Furthermore, the embodiment requires the initialisation for one frame only (frame 123); for each other frame, the segmented contour from the previous frame will be propagated to the current frame as the initialisation. In comparison, the original GVF method requires contour initialisation for every individual frame in the sequence, which is a hindrance to automation.

As noted above, the GVF method is just one of the possible applications of the first aspect of the invention. To adapt the embodiment to other methods, we would change Equations (A) and (B) to a form appropriate to the alternative image segmentation kernel.

2. Embodiment of the Contour Initialisation Aspect of the Invention

The following paragraphs describe an embodiment of the clustering aspect of the invention, referred to as the circular shape fuzzy c-means (CS-FCM) image segmentation algorithm. A brief review of the fuzzy c-means (FCM) algorithm is presented first, followed by a description of the embodiment.

Mathematically, the FCM algorithm is used to minimize an objective function $J_{fcm}$, with respect to the membership function $u_{k|ij}$ and the cluster centre $v_k$, such that $$J_{fcm} = \sum_{x_{ij} \in I} \sum_{k=1}^{K} (u_{k|ij})^m \cdot d_{kij} \text{ subjected to} \quad (1)$$

$$\sum_{k=1}^{K} u_{k|ij} = 1, u_{k|ij} \in [0,1], \forall x_{ij} \in I$$

where m is a weighting exponent on the fuzzy memberships. Note that $x_{i,j}$ simply refers to the pixel (i,j) of the image I, and the first summation above is over all pixels in the image.

A value of m=2 is known to give good results with the FCM algorithm. The parameter $u_{k|ij}$ is the membership of the (i,j)th pixel $x_{ij}$ in the (k)th cluster, and $d_{kij}$ is the squared Euclidean distance between the pixel $x_{ij}$ and the cluster centre $v_k$ where $$d_{kij} = \|x_{ij} - v_k\|^2 \quad (2)$$

The minimization of (1) gives the updating equations for the membership $u_{k|ij}$ and cluster centre $v_k$, which are given by $$u_{k|ij} = \frac{(x_{ij} - v_k)^{-2/(m-1)}}{\sum_{k=1}^{K}(x_{ij} - v_k)^{-2/(m-1)}} \text{ and } v_k = \frac{\sum_{x_{ij} \in I} u_{k|ij}^m x_{ij}}{\sum_{x_{ij} \in I} u_{k|ij}^m} \quad (3)$$

The FCM algorithm is summarized as follows:
1) Fix the cluster number K.
2) Initialize the cluster centres $\{v_k\}_{k=1}^{K}$.
3) Update the membership function and cluster centre by using Equation (3) until $\|v_{new} - v_{old}\| \le \varepsilon$, where $\varepsilon$ is a small positive threshold, e.g., $\varepsilon = 0.001$.

Turning to the embodiment, let $f_k(i,j,s)$ represent the geometric circular shape function. By incorporating it into (2), we have anew dissimilarity measure $\hat{d}_{kij}$, as shown below $$\hat{d}_{kij} = d_{kij} + \alpha f_k(i,j,s) \quad (4)$$

where $\alpha$ is the weighting parameter used to adjust the weight of the spatial shape information against the intensity related feature. The function $f$ can be seen as a penalty term which is applied equally to all the clusters. The effect is to make the FCM clustering algorithm separate the pixels into groups/clusters that are of similar intensity and form the shape of a circle. The circular shape function $f_k(i,j,s)$ is expressed as $$f_k(i,j,s) = \left[\frac{(i-x_c)^2 + (j-y_c)^2}{r}\right]^{\beta_k} \quad (5)$$

where $s = \{x_c, y_c, r\}$ is a unique clique (i.e. set of values) that denotes the circular shape, $x_c$ and $y_c$ denote the geometric x- and y-coordinates of the centre of a circular shape, and r denotes the radius of the circular shape. The exponent parameter $\beta_k$ ensures a small value for the pixels within the k-th cluster and a large value for the pixels outside the cluster.

The circular shape function $f_k(i,j,s)$ represents geometric information and its influence in the objective function is controlled by the weighting parameter $\alpha$. The dissimilarity measure $\hat{d}_{kij}$ consists of a measure of the intensity dissimilarity between the (i,j)th pixel $x_{ij}$ and the (k)th centre $v_k$ in the intensity space as well as a distance dissimilarity in the spatial space. With the inclusion of the circular shape information, several advantages are achieved:
i) Pixels with similar intensity but located in disjointed regions can be differentiated; and
ii) A large membership for the cluster associated with the LV region can be obtained.

By using the newly defined dissimilarity measure in Equation (4), the embodiment performs the minimization of the following objective function $$J_{cs-fcm} = \sum_{x_{ij} \in I} \sum_{k=1}^{K} (u_{k|ij})^m \cdot \hat{d}_{kij} \quad (6)$$

The partial derivative of $J_{cs-fcm}$ with respect to membership $u_{k|ij}$ and cluster centre $v_k$ yields the following updating equations $$u_{k|ij} = \frac{\hat{d}_{kij}^{-1/(m-1)}}{\sum_{k=1}^{K} \hat{d}_{kij}^{-1/(m-1)}} \text{ and } v_k = \frac{\sum_{x_{ij} \in I} u_{k|ij}^m x_{ij}}{\sum_{x_{ij} \in I} u_{k|ij}^m} \quad (7)$$

The partial derivative of $J_{cs-fcm}$ with respect to s gives $$x_c = \frac{\sum_{x_{ij} \in I} i \cdot u_{k|ij}^m}{\sum_{x_{ij} \in I} u_{k|ij}^m} \text{ and } y_c = \frac{\sum_{x_{ij} \in I} j \cdot u_{k|ij}^m}{\sum_{x_{ij} \in I} u_{k|ij}^m} \text{ and} \quad (8)$$

$$r = \sum_{x_{ij} \in LV} (i - x_c)^2 + (j - y_c)^2 \quad (9)$$

The CS-FCM algorithm is summarized in the following steps:
Step 1: Fix the cluster number K. Initialize the cluster centres $\{v_k\}_{k=1}^{K}$.
Step 2: Update the membership function and cluster centre by using Equation (7).
Step 3: Update the circular shape by using Equations (8) and (9).
Step 4: Repeat Steps 2 to 3 until $\|v_{new} - v_{old}\| \le \varepsilon$, where $\varepsilon$ is a small positive threshold, e.g., $\varepsilon = 0.001$.

Results

To demonstrate the performance of the proposed CS-FCM method for cardiac LV segmentation we performed the following experiments on real CMR images. For the purpose of qualitative comparison, all the images were also subjected to the standard FCM algorithm. In all examples, we fixed the cluster number as K=2 (i.e. one cluster for LV region and the other for non-LV region) and the weighting parameter as α=0.3 for the CS-FCM. The experimental were produced using $\beta_k=2$ for the LV region, and $\beta_k=-2$ for the non-LV region.

Figure 5:
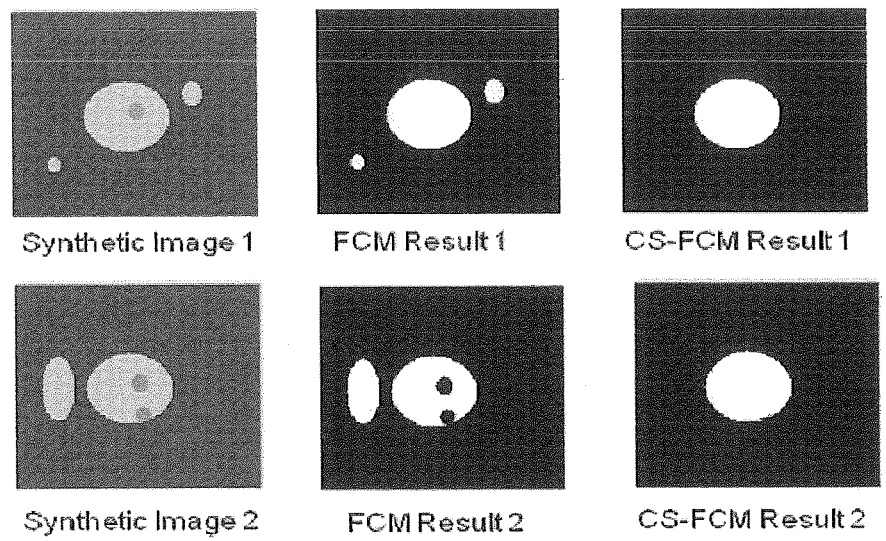
FIG. 5 compares how two synthetic images (shown in the left column) are segmented by conventional FCM (middle column) and an embodiment of the CS-FCM aspect of the invention (right column)

Before performing the segmentation on the real CMR images, we demonstrate the effectiveness of the proposed CS-FCM on two synthetic images, which are the two images in the left column of FIG. 5. It is desired that the method would the target separate the big bright ball in each synthetic image from the others.

The segmentation results of FCM are shown in the second column. The pixels are clustered into two clusters which are respectively shown by a high or low intensity. It can be seen that the FCM partitions the images such that pixels having a similar intensity are treated as belonging to the same cluster even though they are a long way apart. In other words, because it uses the intensity of the original image only, the FCM will cluster all the objects with similar intensity into one cluster regardless of their locations. By contrast, the proposed CS-FCM integrates the spatial shape information into the clustering procedure, such that objects with similar intensity but located in different regions can be differentiated. As shown in the third column, the proposed CS-FCM successfully partitions the image such that the pixels in the bright ball are identified as being one cluster.

Figure 6:
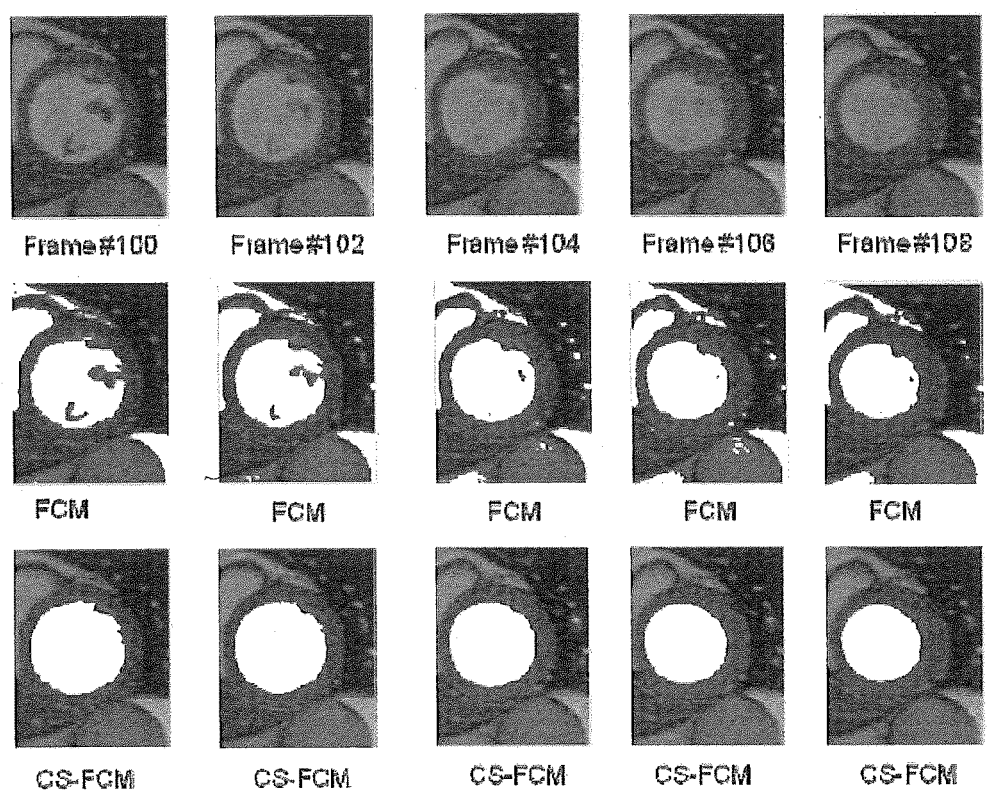
FIG. 6 compares how five frames of a real CMR sequence (shown in the top row) are segmented by conventional FCM (middle row) and an embodiment of the CS-FCM aspect of the invention (bottom row)
Figure 7:
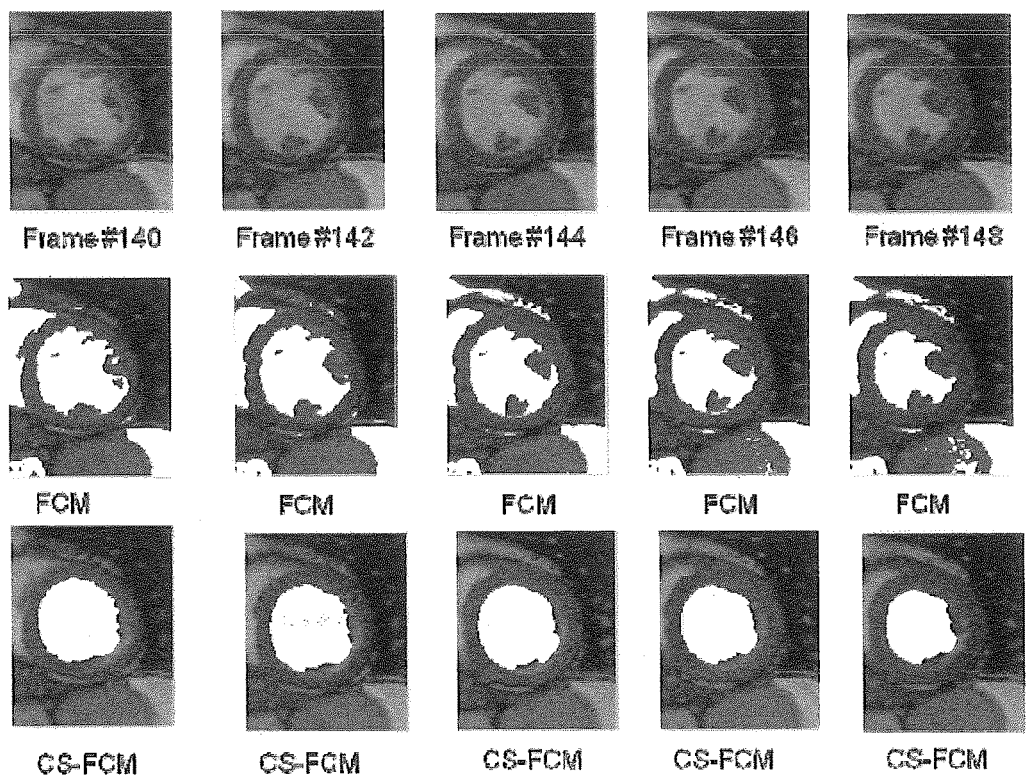
FIG. 7 compares how five further frames of a real CMR sequence (shown in the top row) are segmented by conventional FCM (middle row) and an embodiment of the CS-FCM aspect of the invention (bottom row).

FIG. 6 and FIG. 7 show the segmentation results of the standard FCM and the proposed CS-FCM on CMR images. The images in the top row of FIGS. 6 and 7 are the original CMR images. The segmentation results based on the standard FCM are shown in the middle row in FIG. 6 and FIG. 7. It can be observed from the figures that the standard FCM failed to separate the LV region from the image: the LV region is partitioned into one cluster together with other objects having bright intensities. By contrast, as shown in the bottom row of images, the proposed CS-FCM achieves much better results: it successfully distinguishes the LV from other structures which have similar intensity as the LV; and it correctly segments the LV even when papillary muscles are adjacent to or fall inside the LV region. This illustrates the basic idea of this approach that is to incorporate the circular shape function into the standard FCM algorithm, such that pixels having similar intensity but located in different regions can be differentiated.

What is claimed is:

1. A computerized method of identifying, within a spatial-temporal image comprising a sequence of medical images of a subject captured at a series of respective times, a portion of the spatial-temporal image which corresponds in position to an anatomical structure, the method comprising:
   (a) deriving, within a first of the images, a first segmentation estimate of a region of the first image which corresponds in position to the anatomical structure;
   (b) using the first segmentation estimate of the region of the first image to obtain, within at least one image of the sequence neighbouring the first image, a first segmentation estimate of a region of the at least one neighbouring image which corresponds in position to the anatomical structure, operation (b) comprising:
      (i) using the first segmentation estimate of the region of the first image to initialize an iterative algorithm which, for each neighbouring image, obtains values of a second force function defined over the neighbouring image which minimize a second energy functional defined using the neighbouring image and the second force function; and
      (ii) identifying the first segmentation estimate of the region of the neighbouring image using the values of the second force function which minimize the second energy functional; and
   (c) using the first segmentation estimate of the region of the at least one neighbouring image to obtain a refined segmentation estimate of the region of the first image, wherein the portion of the spatial-temporal image which corresponds in position to the anatomical structure is identifiable based on the refined segmentation estimate.

2. The method according to claim 1, in which operation (c) is performed iteratively for said obtaining of the refined segmentation estimate.

3. The method according to claim 1 in which operation (a) comprises:
   obtaining values of a first force function defined over the first image which minimize a first energy functional defined using the first image and the first force function, and
   identifying the first segmentation estimate of the region of the first image using the values of the first force function which minimize the first energy functional.

4. The method according to claim 1, wherein operation (a) comprises:
   obtaining values of a first force function defined over the first image which minimize a first energy functional defined using the first image and the first force function, and
   identifying the first segmentation estimate of the region of the first image using the values of the first force function which minimize the first energy functional; and
   wherein said operation (c) is performed by:
      generating a modified first force function defined over the first image, by modifying the first force function for the first image using the second force function for the or each neighbouring image, and
      identifying the region of the neighbouring image using the modified first force function.

5. The method according to claim 1 in which the anatomical structure is a first ventricle, and operation (a) comprises:
   obtaining an initial segmentation estimate of the region of the first image corresponding in position to the first ventricle by a clustering algorithm to partition pixels of the first image into clusters, by minimizing a dissimilarity function which is a sum over the clusters of a respective dissimilarity measure of the clusters,
   the dissimilarity measure for at least one of the clusters employing a term which takes a relatively lower value for a pixel of the cluster within a circular region and a relatively higher value for a pixel of the cluster outside the circular region.

6. The method according to claim 5 further comprising improving the initial segmentation estimate iteratively to obtain the first segmentation estimate of the region of the first image.

7. The method according to claim 5 in which the first ventricle is a left ventricle (LV).

8. The method according to claim 1, wherein operation (a) comprises:
   defining a circular region within the first image defined by a plurality of parameters including a centre location of the circular region;
   defining a plurality of clusters;
   apportioning pixels of the first image between the clusters; and varying the parameters defining the circular region, to minimize a dissimilarity function which is a sum over the clusters of a respective dissimilarity measure of the cluster, wherein the dissimilarity measure includes, for at least one of the clusters, a term which takes a relatively lower value for a pixel of the cluster within the circular region and a relatively higher value for a pixel of the cluster outside the circular region.

9. The method according to claim 8 in which the anatomical structure is a left ventricle (LV).

10. The method according to claim 1 in which the medical images are cardiac magnetic resonance (CMR) images.

11. A computer system comprising a computer processor and a data storage device storing computer program instructions operative to cause the computer processor to identify, within a spatial-temporal image comprising a sequence of medical images of a subject captured at a series of respective times, a portion of the spatial-temporal image which corresponds in position to an anatomical structure, the computer processor identifying the portion by:
  (a) deriving, within a first of the images, a first segmentation estimate of a region of the first image which corresponds in position to the anatomical structure;
  (b) using the first segmentation estimate of the region of the first image to obtain, within at least one image of the sequence neighbouring the first image, a first segmentation estimate of a region of the at least one neighbouring image which corresponds in position to the anatomical structure, operation (b) comprising:
    (i) using the first segmentation estimate of the region of the first image to initialize an iterative algorithm which, for each neighbouring image, obtains values of a second force function defined over the neighbouring image which minimize a second energy functional defined using the neighbouring image and the second force function; and
    (ii) identifying the first segmentation estimate of the region of the neighbouring image using the values of the second force function which minimize the second energy functional; and
  (c) using the first segmentation estimate of the region of the at least one neighbouring image to obtain a refined segmentation estimate of the region of the first image, wherein the portion of the spatial-temporal image which corresponds in position to the anatomical structure is identifiable based on the refined segmentation estimate.

12. A non-transitory computer program product storing computer program instructions operative to cause a computer processor to identify, within a spatial-temporal image comprising a sequence of medical images of a subject captured at a series of respective times, a portion of the spatial-temporal image which corresponds in position to an anatomical structure, the instructions being operative to cause the computer processor to identify the portion by:
  (a) deriving, within a first of the images, a first segmentation estimate of a region of the first image which corresponds in position to the anatomical structure;
  (b) using the first segmentation estimate of the region of the first image to obtain, within at least one image of the sequence neighbouring the first image, a first segmentation estimate of a region of the at least one neighbouring image which corresponds in position to the anatomical structure, operation (b) comprising:
    (i) using the first segmentation estimate of the region of the first image to initialize an iterative algorithm which, for each neighbouring image, obtains values of a second force function defined over the neighbouring image which minimize a second energy functional defined using the neighbouring image and the second force function; and
    (ii) identifying the first segmentation estimate of the region of the neighbouring image using the values of the second force function which minimize the second energy functional; and
  (c) using the first segmentation estimate of the region of the at least one neighbouring image to obtain a refined segmentation estimate of the region of the first image, wherein the portion of the spatial-temporal image which corresponds in position to the anatomical structure is identifiable based on the refined segmentation estimate.

* * * * *